June 19, 1962 N. C. WILLIAMS 3,039,193
SPEED CONTROL SYSTEM FOR ULTRA HIGH SPEED
AIR TURBINE DRIVEN DENTAL DRILL
Filed Sept. 12, 1958 2 Sheets-Sheet 1
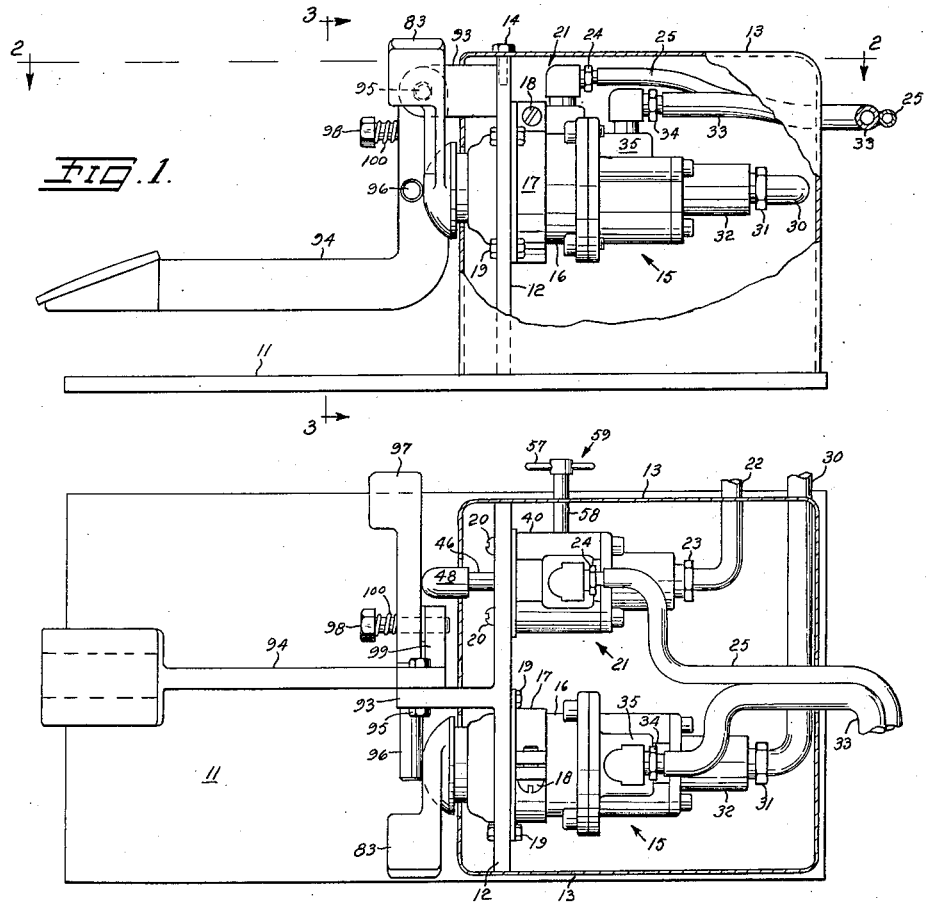
FIG. 1.
FIG. 2.
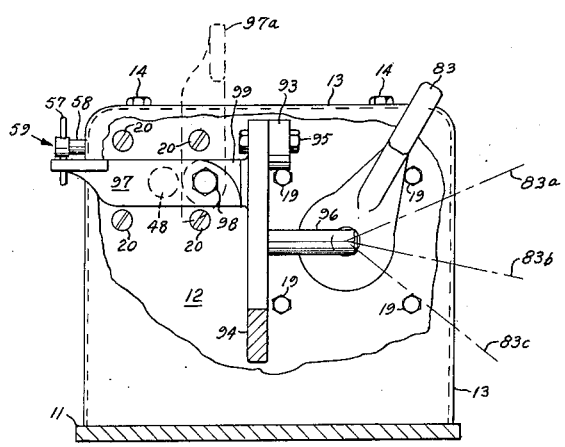
FIG. 3.
INVENTOR
Norman C. Williams
AGENT June 19, 1962 N. C. WILLIAMS 3,039,193
SPEED CONTROL SYSTEM FOR ULTRA HIGH SPEED
AIR TURBINE DRIVEN DENTAL DRILL
Filed Sept. 12, 1958 2 Sheets-Sheet 2

INVENTOR
Norman C. Williams

BY

AGENT

United States Patent Office 3,039,193
Patented June 19, 1962

3,039,193
SPEED CONTROL SYSTEM FOR ULTRA HIGH SPEED AIR TURBINE DRIVEN DENTAL DRILL
Norman C. Williams, Portland, Oreg., assignor to Power Brake Equipment Company, a corporation of Oregon
Filed Sept. 12, 1958, Ser. No. 760,754
3 Claims. (Cl. 32—28)

This invention relates generally to control systems and more particularly to an improved pedal operated speed modulating control system for an ultra high speed air turbine driven dental drill requiring water cooling of the drill and the dental material being drilled.

In late years the art of tooth repair and reconstruction has been greatly advanced by the development of dental drill hand pieces with the ability of driving the drill at rotary speeds of well over one hundred thousand revolutions per minute. One type of hand piece is capable of giving the ordinary electric motor driven drill an increase of maximum speed of about ten to one by adding another belt and pulley speed increaser in the hand piece itself.

However the more elegant recent development in high speed drill hand pieces is the addition of a small air driven turbine at the drill end of the hand piece. The turbine is driven with air under modulated pressures varying under one hundred pounds per square inch pressure as desired. Spent air from the turbine is allowed to leak from the turbine case through small holes therein to dry the tooth and gum surface near the drilling area in the mouth of the patient. Air from a source of air under pressure is led through an air pressure regulator, a filter and a misting oiler to be prepared for its work in the turbine and then through an on and off pedal operated solenoid valve and through a flexible rubber tube to the handle end of the hand piece including the turbine.

Since the drill has to be water cooled, water under two or three pounds pressure is led from a source thereof through a water filter and a manually operated flow limiting valve and an on and off pedal operated electric solenoid valve through a flexible rubber tube to the handle end of the hand piece from where a water conduit within the handpiece leads the water to the drill end of the handpiece to a small hole through which the cooling water is jetted at low pressure in a minute stream onto the drill and the material being drilled.

It is seen that before my improved control system the air and water controls used in dental drilling with air power had two groups of control elements as follows. In one metal enclosure away from the drill stand was placed a manufacturer's enclosing cabinet hiding the air regulator, the air filter, the air oiler, and the solenoid on and off air valve. A stem of the air pressure regulator sticking out through a hole in the cabinet was manually operable to adjust the air pressure and thereby adjust the speed of the turbine. Since soft teeth or teeth with caries require that the drill be run at a relatively low speed while strong hard teeth require that the drill be run at a much higher speed it is seen that the dentist was required to stop his work and go to the cabinet to adjust the speed of his drill to the changes in his work by trial and error. Also in the cabinet were the manually operated water regulating valve the water filter and the solenoid operated on and off water valve. The rate of water flow was manually regulated by the dentist at the cabinet.

The second group of control elements consisted merely of a pair of foot operated electric switches one for the solenoid air valve and the other for the solenoid water valve in a common base on the floor near the dental chair.

A first air tube and a second water tube connected the wall cabinet with the drill hand piece and a set of electric wires connected the switch pedal group with the solenoids in the cabinet, the cabinet being supplied with electric power supply terminals.

It is the primary object of my improved control system to provide in one enclosure conveniently located on the floor near the dental chair all of the air and water controls needed to be manipulated by the dentist in the progress of his work.

It is a second object to provide such a system having no electric parts and requiring no electric cords and no electric switches.

It is a third object to provide such a system with a first foot lever operated air pressure modulating control operable to vary the speed of an air turbine dental drill over the complete range of speeds required by the dentist in his work.

It is a fourth object to provide such a system with a second foot lever selectively operable to a plurality of positions each setting an individual minimum speed for a dental drill, yet allowing a first foot lever modulatingly to raise the speed above that set by any but the highest minimum settings of the second foot lever.

It is a fifth object to provide such a system with a water control valve operable between on and off positions by a third foot lever hingedly attached to said first foot lever for movement on said first foot lever between positions of engagement and non engagement with the operating stem of said water control valve.

How these and other objects are attained is explained in the following specifications referring to the attached drawings in which FIG. 1 is fragmentary view in side elevation of the novel and useful combination of parts included in the pedal operated floor mounted control station of this invention.

FIG. 2 is a plan view in partial section along the line 2—2 of FIG. 1.

FIG. 3 is an end elevation in partial section along the line 3—3 of FIG. 1, and with part of the enclosing cover broken away.

Like reference numerals refer to like parts in the several figures of the drawings.

Figure 4:
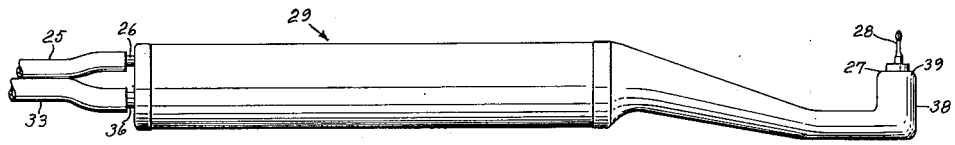
FIG. 4 is a view in side elevation of an air operated turbine driven drill hand piece for which the present invention provides improved operation.

Referring now to the drawings the control system of this invention is seen to comprise a floor mounted pedal operated air and water control station having a floor plate 11 with a vertical transverse support wall 12 secured thereon as by welding, not shown. A partial cover 13 for the control station is seen to be secured thereto by cap screws 14.

Figure 5:
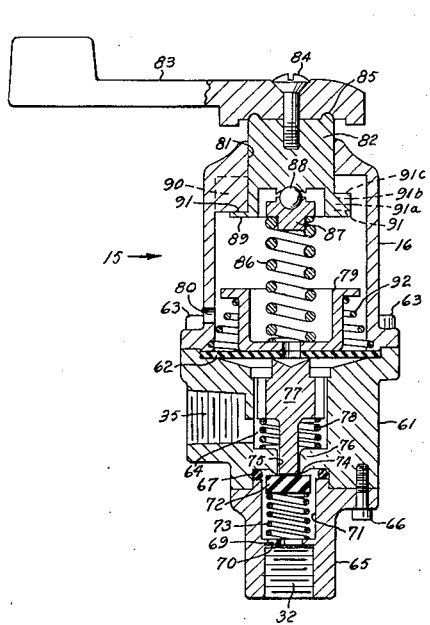
FIG. 5 is a view in axial section of a modulating air control adapted for use in the practice of this invention.

The modulating air pressure control valve referred to generally as 15 is shown in FIG. 5 to have a cylindrical upper body part 16 which in FIGS. 2 and 3 is seen to extend through a hole formed therefor in support wall 12 and to be secured to wall 12 by a flanged clamp band 17 secured to body part 16 by screw 18 and to wall 12 by bolts 19.

Figure 6:
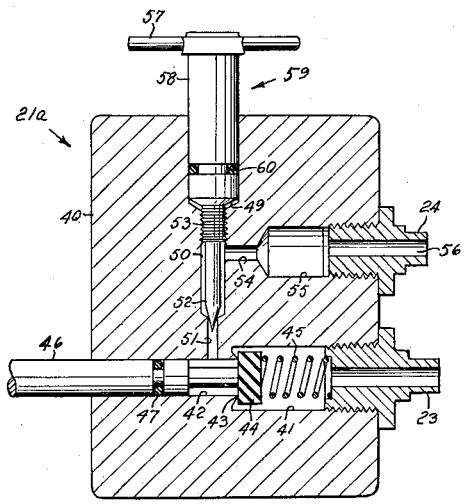
FIG. 6 is a schematic view in partial section showing the water valves found useful in the practice of this invention.

Also secured to support wall 12 by screws 20 is the on and off water control valve indicated generally in FIGS. 1 and 2 by the reference numeral 21 and in scheme in FIG. 6 by the reference numeral 21a.

A tube 22 for low pressure water connects a source thereof (not shown) with inlet fitting 23 at the water inlet opening of water valve 21. A second water tube 25 connects outlet fitting 24, at the water outlet opening of water valve 21, with the water inlet end of water conduit 26, the other end 27 of which ejects the water in a low pressure stream towards the cutting end of drill 28 of hand piece 29.

A tube 30 for air under pressure connects a source thereof (not shown) with inlet fitting 31 at the air inlet opening 32 of modulating air pressure control 15. A second air tube 33 connects outlet fitting 34 at outlet opening 35 of air control 15 with the air inlet end of air conduit 36 the other end of which (not shown) forms the driving air nozzle (not shown) of the air turbine (not shown) within the end 38 of hand piece 29. Spent air from the turbine is ejected through small holes 39 in the end 38 of hand piece 29. The turbine of course is direct connected to drill 28.

Other essential parts like air and water filters, air oiler, etc. which are not essential to the novelty of the present combination are omitted for the sake of simplicity of essential description although in practice these are also mounted under the cover 13 and connected in the air or water circuits as described.

Referring now to the schematic sectional drawing 21a (FIG. 6) of the water valve 21, the body 40 is seen to be formed with a larger water inlet bore 41 and a smaller operating stem bore 42 leading from one outside face of body 40 to inlet 41. Within inlet bore 41 around the intersection therewith of stem bore 42 is formed an on and off valve seat 43 against which valve disk 44 is yieldingly held by closing biasing spring 45. Operating stem 46 is freely longitudinally movable in bore 42 and sealed therein by O-ring 47. As seen in FIG. 2 operating stem 46 extends freely through a hole formed through wall 12 and is capped with a nylon cap 48.

Again body 40 of water valve 21, as seen in FIG. 6, is formed from an outside face thereof with a needle valve stem bore 49 extended inwardly by a smaller diameter needle valve outlet bore 50 and further extended inwardly by a further reduced diameter needle valve inlet bore 51 opening from operating stem bore 42 as shown. The opening from needle valve inlet bore 51 to needle valve outlet bore 50 forms a needle valve seat which in cooperation with needle valve 52 axially positioned by threads 53 cooperatively formed within outlet bore 50 and on the outside of needle valve stem 59 sets the resistance to flow of water from operating stem bore 42 to needle valve outlet bore 50. As shown in FIG. 6 passageways 54, 55 and 56 conduct water from bore 50 to tubing 25. Manual knob 57 on the outer end of the larger section 58 of needle valve stem 59, is used to position needle valve 52. Stem 58 is slidingly sealed into bore 49 by O-ring 60. In FIG. 2 it is seen that the stem 58 of needle valve 59 extends outside cover 13 so that the amount of the water flowing to cool the drill is adjustable at all times.

Now referring to the modulating air valve 15, as shown in detail in FIG. 5, valve 15 is seen to have a lower body part 61 between which and upper body part 16 diaphragm 62 is clamped by screws 63 to seal the air valve outlet space 64 under diaphragm 62 from leakage past diaphragm 62. Lower end body part 65 is held by screw 66 to lower body part 61 and sealed thereto by O-ring 67. The interior of body part 65 is seen to be divided transversely by an annular rib 69 against the under side of which in space 32 is pressed an air screen 70. Within lower body part 61, the air inlet space 71 is separated from the air outlet space 64 by a valve disk 72 biased by spring 73 towards a seated position against valve seat 74 formed about the inlet end of passageway 75 formed centrally through wall 76. Spacer stem 77 is axially movably biased by spring 78 towards diaphragm 62 against which it is seated to prevent air flow through the central holes in diaphragm 62 and spring cup 79. Stem 77 does not prevent free passage of air in the space 75—64 between valve 72 and diaphragm 62.

The interior of upper body part 16 of air pressure modulator 15 is open to atmosphere through hole 80.

Inserted from the inside out through the upper central hole 81 of upper body part 16 is a freely rotatable plug 82 secured to modulating lever 83 by screw 84 and prevented from turning with respect to lever 83 by detents 85.

Pressure modulating spring 86 held in compression between spring cup 79 and diaphragm 62 on one end and by ball support 87, ball 88 and plug 82 on the other end, presses the stepped upper surface of flange 89 against the detent lower surface of plug 82.

It should be understood that at three equally spaced positions about the vertical axis of the interior of upper body part 16, radially inwardly extending detents 90 depend from the upper end of part 16. Again the upper surface of flange 89 of plug 82 is divided into three equal sectors and symmetrically formed on each of the sectors are basic lower off position steps 91 on which the detent 90 is seen to be resting in FIG. 5 and three progressively higher steps 91a, 91b and 91c, as indicated. In 120 degrees of rotation of handle 83 it is seen that from the closed position of valve 72 on its seat 74 with flange step 91 against the underside of detent 90 there will be three progressively wider open positions of valve 72 as handle 83 is turned to move flange steps 91a, 91b and 91c under their respective detents. Or it is seen that without turning handle 83 from its closed position the axial position of plug 82 can be moved in infinitely short steps merely by pushing down on screw 84 and plug 82.

To keep the parts of modulating valve 15 in their proper positions even when not in use, it is seen that cup spring 92 always biases spring cup 79 upwardly to hold modulating spring 86 up against ball support 87, stem spring 78 holds spacer stem 77 sealed into contact with diaphragm 62 over the central hole therein, and spring 73 biases main air valve 72 towards closure on valve seat 74. At all times therefore the outlet air pressure in space 64 presses upwardly on diaphragm 62 and is balanced by the pressure downwardly on diaphragm 62 of modulating spring 86 so that the pressure of air in space 64 leaving the valve through outlet opening 35 is always fixed by the axial position of plug 82 and the compression of spring 86.

As seen in FIGS. 1 to 3, a hinge lug 93 is secured forwardly on support wall 12 and pedal lever 94 is hinged thereto by bolt 95. Round bar 96 is secured to lever 94 and positioned to engage modulating lever 83 of valve structure 15 as shown.

Lever 97 is hinged by screw 98 to lug 99 secured to lever 94 as shown. The pressure of spring 100 on lever 97 frictionally holds lever 97 in its angular position about screw 98. Thus when the dentist moves lever 97 in a counter clockwise direction it will be stopped by lug 99, as shown in FIG. 3, in a position to engage cap 48 of water valve stem 46 when lever 94 is pressed downwardly. If lever 97 is moved to the dotted position 97a, water valve stem 46 will not be operated by lever 94.

Referring to FIGS. 3 and 5, the position shown for handle 83 in FIG. 3 corresponds to that shown in FIG. 5 wherein off position step 91 of flange 89 of plug 82 are held against detent 90 formed on the interior of upper body part 16 of air valve 15. In like manner the positions of handle 83 indicated in FIG. 3 as 83a, 83b and 83c, correspond respectively to the positions of engagement of detents 90 respectively with steps 91a, 91b and 91c of flange 89 of plug 82 of valve structure 15.

In operation of the control system of this invention the dentist will have a patient in his dental chair and will have the control apparatus shown in FIGS. 1 to 3 on the floor near the chair for convenient foot manipulation while he is in working position. Lever 97 and handle 83 will be in their positions shown in FIG. 3. With his drill hand piece 29 in working position the dentist presses down with his foot on lever 94 which immediately causes lever 97 to move water valve stem 46 to allow water to pass at whatever rate the dentist has preset with needle valve knob 57. At the same time bar 96 moves handle 83 inwardly of air valve 15 to increase the pressure of spring 86 on valve 72 and admit air under pressure to space 64 and hose 33 to start the drill driving air turbine in space 38 of hand piece 29. According to his experience in drilling with drills capable of high speed operation the dentist variably positions lever 94 with one of his feet as the work he is doing requires a greater or lesser optimum speed of his drill 28.

Should the dentist be working on material of a relatively uniform hardness with which a relatively fixed drill speed will be satisfactory, the dentist can relieve his foot of the necessity of holding lever 94 in the best drilling speed position by setting lever 83 to the low speed position 83a, the medium speed position 83b, or the high speed position 83c as most nearly suits his average speed requirement. In this case the weight of lever 94 and the friction of O-ring seal 47 in bore 42 of water valve 21 will maintain the required flow of cooling water to the drill.

At any time if it is desired to run the drill without using the cooling water it is only necessary to shift lever 97 to the position 97a as shown in FIG. 3.

Having recited some of the objects of my invention, illustrated and described a preferred way of practicing my invention and explained its operation, I claim:

1. The combination with an ultra high speed air turbine driven dental drill requiring water cooling of the drill and the dental material being drilled, of a control system for said drill, said system including a source of air under a sufficient pressure to drive said turbine at its highest required speed, a source of water under a required pressure, an air conduit connecting said turbine with said source of air, a water conduit connecting said water source with a water outlet at said drill, and an improved pedal operated floor positioned air and water control unit connected into both said conduits, said control unit including an air valve mechanism comprising an air valve biased towards a closed position and a push stem having a spring compressible over a preset range to set the air outlet pressure of said valve over a desired range, a first pedal operable lever means to move said push stem through a plurality of valve stem opening steps to determine a plurality of minimum speeds of said turbine including a zero speed step, and a second pedal operable lever means to move said push stem through an infinite number of steps between any preset one of said minimum speed steps and the full open position of said valve, modulatingly to control the speed of said turbine.

2. The combination of claim 1 in which said floor positioned control unit includes in series in said water conduit, a variably positionable water valve and an on and off water valve, said variably positionable water valve being adapted to set a desired constant rate of water flow through said water conduit when said on and off valve is open, said on and off valve being spring biased towards its closed position, said on and off valve including a push stem movable towards said valve to open said valve, and said second pedal operable lever means includes a third pedal operable lever means rotatably secured thereon between positions of non operation and of operation of said on and off water valve to its open position by said third pedal operable lever means when said second pedal operable lever means is moved in its direction of opening said air valve.

3. The combination with an ultra high speed air turbine driven dental drill requiring water cooling of the drill and the material being drilled, of a control system for said drill, said system including a source of air under a sufficient pressure to drive said turbine at its highest required speed, a source of water under a required pressure, an air conduit connecting said air source with said turbine, a water conduit connecting said water source with a water outlet at said drill, an improved floor positioned air and water control unit having a pedal operated air valve means in said air conduit for controlling the air pressure at said turbine to modulate the speed of said drill, a pedal operated water valve means in said water conduit to modulate the rate of water flow from said outlet and a common pedal means for operating said air valve means and said water valve means in unison to modulate in unison the speed of said drill and the cooling water supplied thereto, said pedal operated air valve means including means forming an air inlet space, means forming an air outlet space, an air valve adapted on axial movement in an opening direction thereof to open said inlet space to said outlet space and on sufficient axial movement in the other direction thereof to close said outlet space from said inlet space, a push stem for said valve, said push stem being axially movable with respect to said valve and spaced therefrom on their air outlet side thereof, a compression spring axially aligned with said valve between said stem and said valve resiliently to bias said valve towards its closed position, lever means secured to said stem to rotate therewith step by step to advance said stem towards said valve to determine a desired one of plural minimum closure pressures of said spring on said valve, means responsive to the air pressure in said outlet space to react against the pressure of said spring on said valve to determine the air pressure in said outlet space, and foot pedal means adapted on increase of foot pressure thereon to decrease smoothly the spacing of said stem and said valve by said spring gradually to increase the air pressure in said outlet space.

References Cited in the file of this patent
UNITED STATES PATENTS

| | | |
|---|---|---|
| 1,244,226 | Metzger | Oct. 23, 1917 |
| 2,532,054 | Broussard et al. | Nov. 28, 1950 |
| 2,542,833 | Page | Feb. 20, 1951 |
| 2,866,267 | Fletcher et al. | Dec. 30, 1958 |